June 3, 1930.  D. FOREMAN  1,762,054
CAMERA
Filed Sept. 10, 1928  3 Sheets-Sheet 1
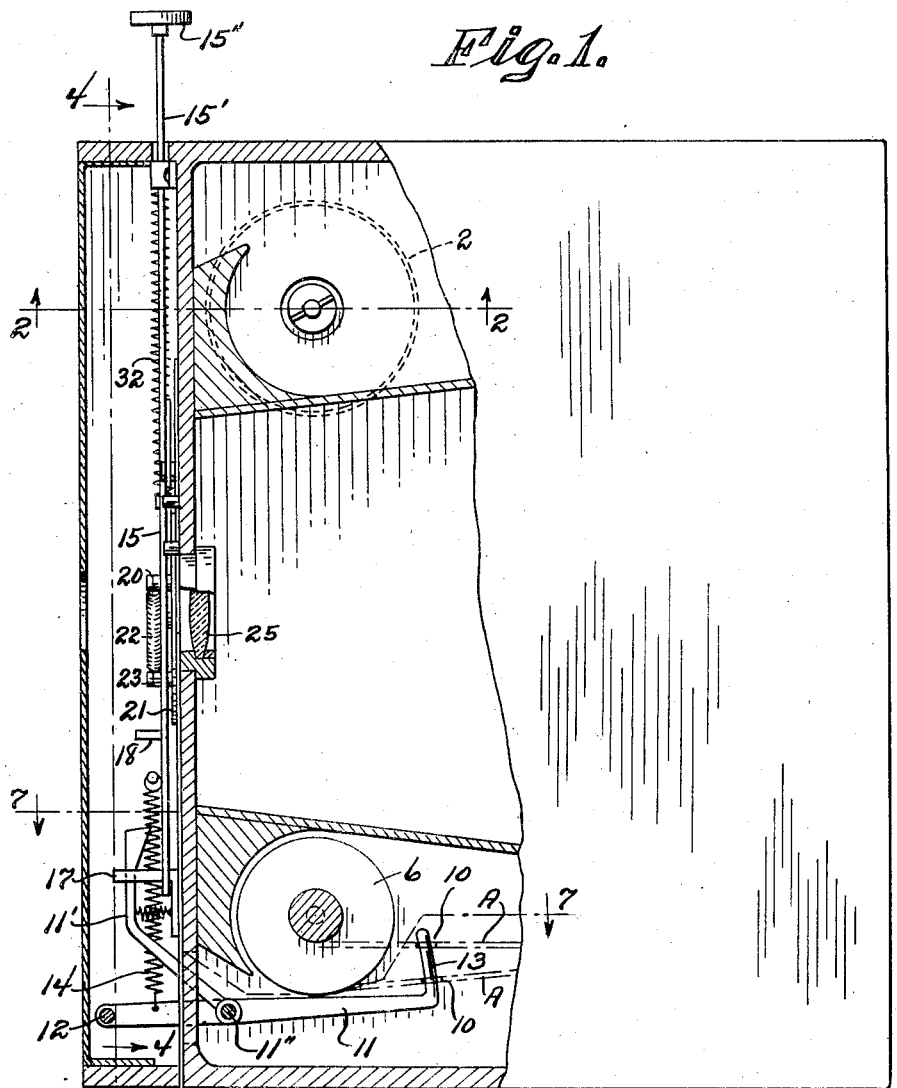
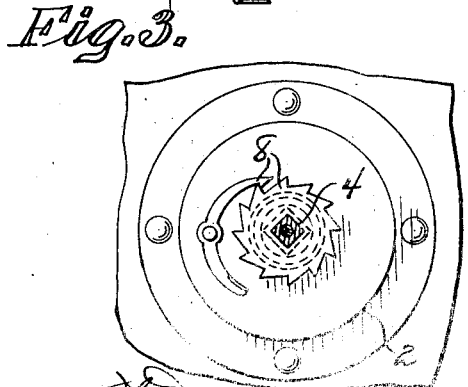
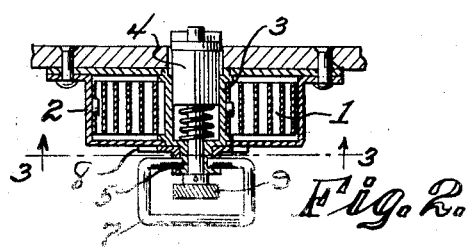

June 3, 1930.  D. FOREMAN  1,762,054
CAMERA
Filed Sept. 10, 1928  3 Sheets-Sheet 2

Dave Foreman
INVENTOR

BY Victor J. Evans
ATTORNEY

WITNESS

June 3, 1930.  D. FOREMAN  1,762,054
CAMERA
Filed Sept. 10, 1928   3 Sheets-Sheet 3
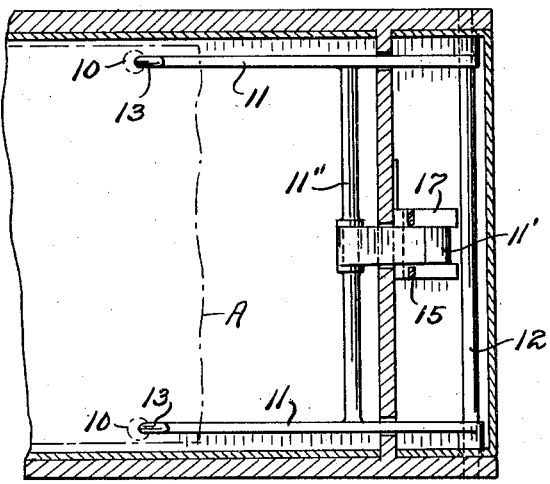
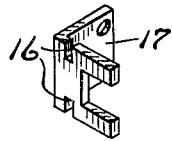
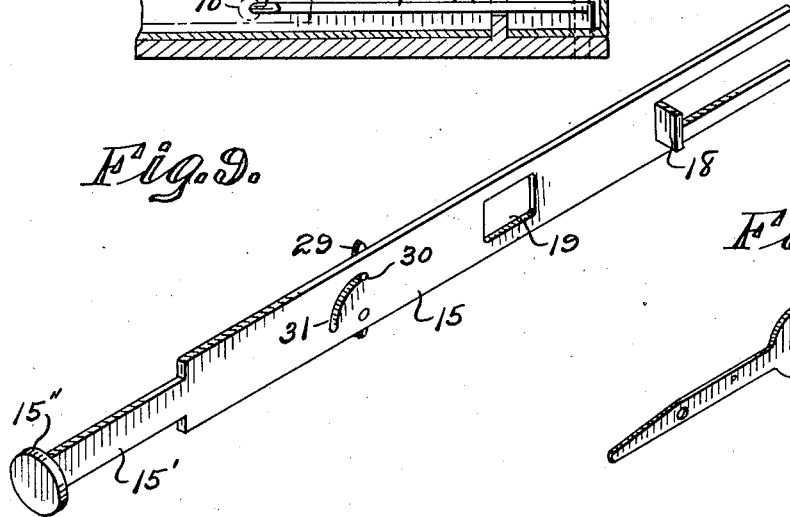
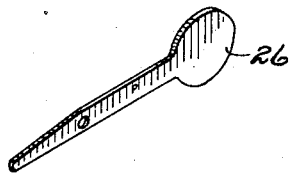
Dave Foreman
INVENTOR Patented June 3, 1930

1,762,054

UNITED STATES PATENT OFFICE

DAVE FOREMAN, OF LENORAH, TEXAS, ASSIGNOR OF ONE-FOURTH TO JOE L. HALL AND ONE-FOURTH TO JOHN R. VANCE, BOTH OF STANTON, TEXAS

CAMERA

Application filed September 10, 1928. Serial No. 305,034.

This invention relates to cameras, the general object of the invention being to provide means for automatically moving a new portion of the film into exposing position after an exposure has been made so that there is no danger of making two exposures on one portion of the film.

This invention also consists in certain other features of construction and in the combination and arrangement of the several parts, to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:—

Figure 1 is a side view of a camera, partly in section, showing the invention in use.

Figure 2 is a section on line 2—2 of Figure 1.

Figure 3 is a section on line 3—3 of Figure 2.

Figure 7 is a section on line 7—7 of Figure 1.

Figure 8 is a view of the bracket which forms the guide for the shutter actuating member.

Figure 9 is a view of said shutter actuating member.

Figure 10 is a view of the cover blind which closes the opening in the shutter when the shutter is returning to its normal position after an exposure has been made.

Figure 4:
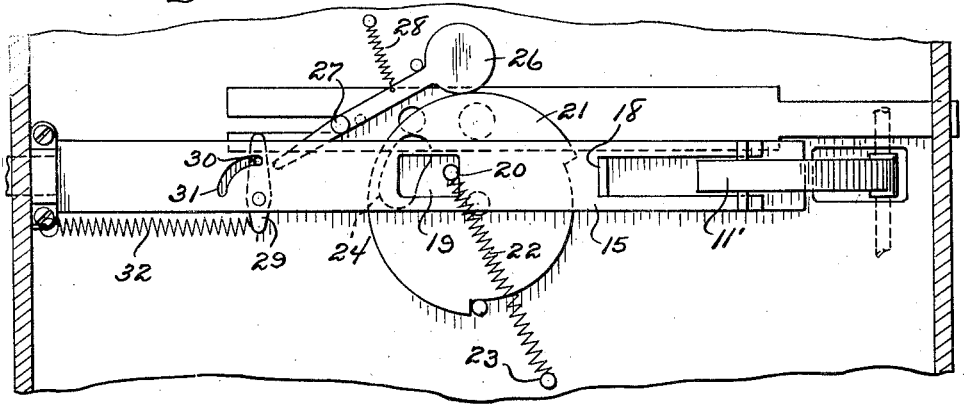
Figure 4 is a section on line 4—4 of Figure 1.

In these views, the numeral 1 indicates a coil spring enclosed in a housing 2 and having one end connected with the housing and its other end connected with a barrel 3 which passes through the housing and is of noncircular shape and receives the square part 4 of a spring plunger 5 which engages one end of one of the spools upon which the film A is wound so that this spring 1 acts to wind the film upon one spool and to draw it off the second spool which is shown at 6 in Figure 1. A handle 7 is attached to the outer end of the barrel so that the barrel can be turned to wind up the spring 1 and ratchet mechanism 8 is associated with the barrel and placed on the outside of the camera so that the parts can be held while the film is being placed in the camera. The outer end of the plunger is provided with a knurled head 9 so that it can be retracted to permit the spool to be put in place or removed from the camera. The film is formed with a plurality of holes 10 which are spaced apart a distance equal to the length of the negatives and a lever 11 is pivoted in the camera, as shown at 12, and has its free end bent, as shown at 13, for engaging these holes, a spring 14 being connected with the lever and acting to cause the end 13 of the lever to pass through a hole in the film as soon as the perforated portion of the film reaches the lever. Thus the lever will act to prevent further movement of the film by the spring 1 until the lever is moved to retracted position to draw the bent end 13 from the hole.

The shutter operating member 15 is slidably arranged in the front of the camera and has a reduced part 15' passing through a hole in the top of the camera, with a button 15'' on its outer end. The member 15 is made in the form of a strip and it has a lower forked end, the prongs of which engage the notches 16 in a bracket 17 supported in the front of the camera so that this bracket acts as a guide for the member 15 and also as a stop for limiting its downward movement as said member 15 is provided with a projection 18 which will strike the bracket and thus prevent further downward movement of said member 15. This member 15 is also provided with a rectangular opening 19 which receives a pin 20 on the disk shutter 21 and a spring 22 connects this pin 20 with a pin 23 on a stationary part of the camera. The shutter is provided with the usual opening 24 which will pass over the lens opening 25 in the front of the camera during the rotary movement of the shutter, so that light can pass into the camera to make the exposure.

Figure 5:
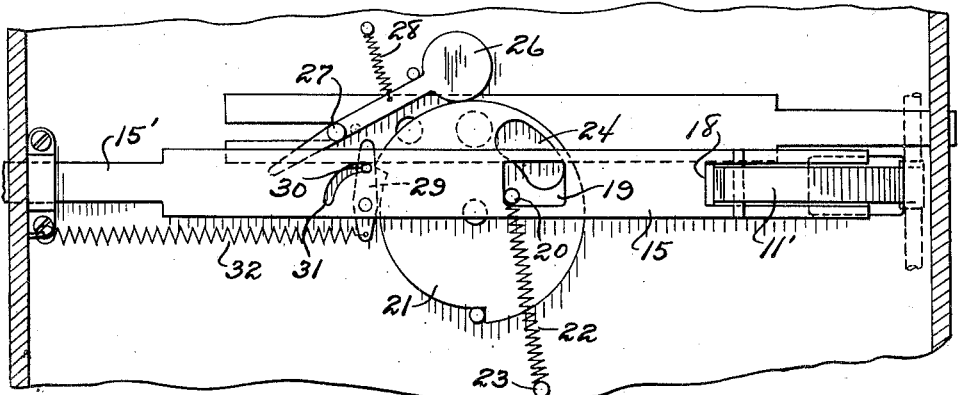
Figure 5 is a similar view, but showing the parts in a different position.
Figure 6:
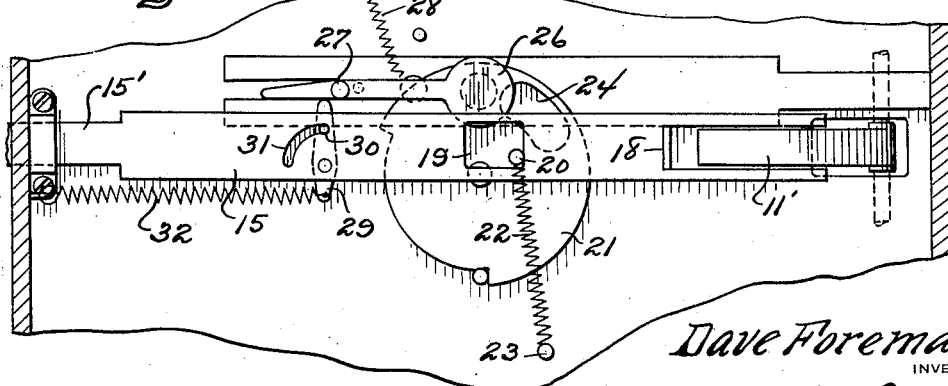
Figure 6 is a similar view, but showing the parts in still another position.

As will be seen from Figures 4, 5 and 6, when the member 15 is depressed, the upper wall of the opening 19 will strike the pin 20, thus forcing the pin downwardly and rotating the shutter until the pin is moved to a certain position, when the spring 22 will complete the movement of the shutter and give it a quick movement to cause the opening 24 to pass over the lens opening 25. This movement will be reversed on the upward movement of the member 15 and in order to prevent rays of light from passing into the camera as the opening 24 passes over the opening 25 on this reverse movement of the shutter, I provide a cover blind 26 which is provided with an enlarged end, said cover blind being pivoted at 27 to a part of the camera and being normally held in inoperative position by a spring 28. A dog 29 is pivoted to the member 15 and has a pin 30 thereon engaging an arc-shaped slot 31 in the member 15, a spring 32 connecting the tail of the dog with a part of the camera, this serving a double purpose of normally holding the dog in horizontal position and the member 15 in raised position. By providing the arc-shaped slot 31 for the pin 30 on the dog, the dog can pass the cover blind 26 on the downward movement of the member 15, but on the upward movement of the member 15, the dog will strike the upper end of the cover blind, thus causing the cover blind to swing inwardly so that its enlarged lower end will cover the lens opening while the opening 24 of the shutter 21 is passing over said lens opening. Thus light is prevented from entering the lens opening during the reverse movement of the shutter 21.

From the foregoing it will be seen that the spring 1 tends to roll the film from the full spool on to the other spool, but this movement of the film is prevented by the lever 11 having its bent end engaging a hole in the film. When a picture is to be taken, the member 15 is depressed in the usual manner, which will cause an opening movement of the shutter 21 and after the exposure has been made, the downward movement of the member 15 will cause the projection 18 to strike a spring pressed arm 11' on the lever 11 so that the lever is swung outwardly and its end 13 freed from the opening in the film so that the spring 1 will start to wind the film upon the receiving spool. Then pressure is removed from the member 15 so that the spring 32 will return said member to its raised position and at the same time the cover blind 26 will be moved to close the lens opening as the shutter 21 is being returned to normal position through action of the upward movement of the member 15 acting on the pin 20 of the shutter 21. Then the spring 14 will move the lever 11 so that its end will ride on the film, and as soon as an opening comes opposite the bent end of the lever, said end will pass into the opening and thus prevent further movement of the film. Thus a new portion of the film is in exposing position and there is no danger of making a second exposure on that part of the film which has just been exposed.

As shown in Figure 7, I prefer to make the lever 11 of two parts which are connected together by a cross bar 11'' and the arm 11' is conected with the center of said rod.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:—

In combination with a camera including its film spools, a plunger member for engaging one end of one of the film spools, a barrel carrying the plunger member, a spring for rotating the barrel, a film carried by the spools and having holes therein, a latch lever engaging the holes for preventing movement of the film under the action of the spring, a reciprocatory shutter actuating member having a hole therein, a circular shutter having an exposure opening therein, a pin connected with the shutter and passing through the hole in the shutter actuating member, a spring for actuating the shutter, a cover blind, a dog on the shutter operating member for operating the cover blind on the upward movement of the shutter operating member, a projection on the shutter operating member and an arm connected with the latch lever and engaged by the projection on the downward movement of the shutter operating member for moving the latch lever to releasing position.

In testimony whereof I affix my signature.

DAVE FOREMAN.